(12) United States Patent
Chu et al.

(10) Patent No.: US 12,012,985 B2
(45) Date of Patent: Jun. 18, 2024

(54) EXPANSION ANCHOR

(71) Applicant: Hilti Aktiengesellschaft, Schaan (LI)

(72) Inventors: Xiaolong Chu, Guilin (CN); Xingda Hu, Irving, TX (US); Marc Schaeffer, Altendorf (CH); Cheng Lin, Jinshawan (CN)

(73) Assignee: Hilti Aktiengesellschaft, Schaan (LI)

( * ) Notice: Subject to any disclaimer, the term of this patent is extended or adjusted under 35 U.S.C. 154(b) by 201 days.

(21) Appl. No.: 17/641,344

(22) PCT Filed: Sep. 3, 2020

(86) PCT No.: PCT/EP2020/074625
§ 371 (c)(1),
(2) Date: Mar. 8, 2022

(87) PCT Pub. No.: WO2021/047995
PCT Pub. Date: Mar. 18, 2021

(65) Prior Publication Data
US 2022/0341452 A1    Oct. 27, 2022

(30) Foreign Application Priority Data

Sep. 12, 2019 (CN) .......................... 201910864034.8

(51) Int. Cl.
*F16B 13/04*    (2006.01)
*F16B 13/06*    (2006.01)

(52) U.S. Cl.
CPC ................................. *F16B 13/068* (2013.01)

(58) Field of Classification Search
CPC ...... F16B 13/124; F16B 13/128; F16B 13/08; F16B 13/063; F16B 13/04; F16B 13/001

USPC ................... 411/15, 18, 27, 35, 54, 55, 60.1
See application file for complete search history.

(56) References Cited

U.S. PATENT DOCUMENTS 3,283,640 A * 11/1966 Ono ...................... F16B 13/068
                                                                411/33
4,011,786 A    3/1977 Liebig
4,122,753 A * 10/1978 Kuhlmann ............ F16B 13/045
                                                                 411/2
(Continued)

FOREIGN PATENT DOCUMENTS

CN    204591910 U    8/2015
CN    208057631 U    11/2018
(Continued)

OTHER PUBLICATIONS

PCT/EP2020/074625, International Search Report dated Nov. 20, 2020 (Two (2) pages).

*Primary Examiner* — Gary W Estremsky
(74) *Attorney, Agent, or Firm* — Crowell & Moring LLP

(57) ABSTRACT

An expansion anchor includes a bolt, a spacer sleeve, an expansible sleeve, an expanding member, and a collar where the collar is disposed between the expansible sleeve and the spacer sleeve. The bolt is insertable into the spacer sleeve, the collar, and expansible sleeve in sequence and a thread of the bolt at a leading end of the bolt is connected to the expanding member to draw the expanding member into the expansible sleeve and expand the expansible sleeve radially. The collar is formed by a first material with a first hardness and a second material with a second hardness where the first hardness is different from the second hardness.

9 Claims, 2 Drawing Sheets

(56) References Cited

U.S. PATENT DOCUMENTS

| | | | |
|---|---|---|---|
| 4,403,734 A | 9/1983 | Gorman | |
| 4,640,654 A | 2/1987 | Fischer et al. | |
| 7,896,580 B2 * | 3/2011 | Weaver | E21D 21/0066 |
| | | | 405/259.4 |
| 2004/0253075 A1 | 12/2004 | Liebig et al. | |
| 2005/0194873 A1 * | 9/2005 | Hoffman | A47B 49/006 |
| | | | 312/305 |

FOREIGN PATENT DOCUMENTS

| | | |
|---|---|---|
| DE | 37 07 510 A1 | 9/1988 |
| DE | 10 2006 039 195 A1 | 3/2008 |
| GB | 1 558 904 A1 | 1/1980 |
| GB | 2 094 919 A | 9/1982 |
| GB | 2 190 164 A | 11/1987 |
| JP | 51-83958 A | 7/1976 |
| JP | 53-24949 A | 3/1978 |
| JP | 60-263716 A | 12/1985 |
| JP | 4-140506 A | 5/1992 |
| JP | 2009-542998 A | 12/2009 |
| WO | WO 2008/003456 A1 | 1/2008 |
| WO | WO 2008/022630 A1 | 2/2008 |

* cited by examiner

EXPANSION ANCHOR

BACKGROUND AND SUMMARY OF THE INVENTION

The present invention relates to a fastener having an expansible sleeve and, more particularly, to an expansion anchor.

Expansion anchors are fasteners designed for use in masonry base material that provides holding power through expansion. Expansion anchors of this type are used particularly for applications where heavy objects must be secured to a support, such as a concrete. This includes the mounting of heavy appliances and the like. Fastening to concrete is unique compared to other fastening applications such as fastening two pieces of metal together by using a screw or a bolt and nut. Concrete anchors are much more difficult to install and use.

Generally, expansion anchors work on the same basic principle—drill a specific sized hole, insert the anchor and expand the anchor larger than the hole in order to make it difficult for the anchor to be pulled out of the hole. Concrete anchors are designed to be inserted into a hole in concrete and not come out.

Typically, an expansion anchor includes of a bolt, a spacer sleeve, a collar, an expansible sleeve, and a cone as an expanding member. The bolt inserts into the spacer sleeve, the collar and the expansible sleeve in sequence, and thread connected to the cone at its leading end, to thereby draw the cone (expanding member) into the sleeve and expand the latter radially.

The collar works as a collapsible section to prevent spinning and could be broken under a certain pre-tension to allow the clamping force equal to the pre-tension force. Moreover, the collapsible section also relates to setting force of the anchor.

Application of torque at the head of the anchor causes the cone to be drawn into the expansible sleeve. This in turn causes the sleeve to expand against the wall of the drilled hole. The ribs or projections on the collar prevent rotation of the sleeve and cone during application of torque. Application of the specified installation torque induces a tension force in the bolt that is equilibrated by a pre-compression force in the concrete acting through the component being fastened. Deformation of the collar prevents buildup of pre-compression in the anchor sleeve in cases where the spacer sleeve is in contact with the washer and permits the closure of gaps between the work surface and the component being fastened.

Today heavy-duty sleeve anchor always has a collapsible section to prevent spinning and could be broken under a certain pre-tension to allow the clamping force equal to the pre-tension force. Moreover, the collapsible section also relates to setting energy of the anchor. There are quite a lot of collapsible sections for sleeve anchors in the world, but most of them using only one material to fulfill above three functions, which is quite limited to perfectly balance the three functions.

As described in GB2094919, the annular member 4 between the spacer sleeve 2 and the expansible sleeve 3 has the same external diameter as the two sleeves 2 and 3. This annular or ring-shaped part 4 consists of a relatively soft, deformable, tough and breakproof material. This ring is made from a relatively soft, deformable material, such as a plastics material which, however, at the same time is tough and breakproof. This ring 4, disposed in the ready assembled state of the expansion anchor according to FIG. 1, between the collar 7 of the expansible sleeve 3 and the collar 2" of the spacer sleeve 2 permits, as will be described in detail hereinafter, at any time a re-tensioning of the high-load expansion anchor for the flush mounting of an object to be fixed by virtue of the expansion anchor, for example, to a wall.

Also, as described in GB2190164, preferably, the washer or collar is a molded hollow body of a resilient elastomeric material such as E.P.D.M. but may be of any form and of any non-corrosive and corrosion resistant material, e.g., rubber, neoprene so as to be resiliently or otherwise sufficiently compressible or crushable. For example, the collar could possibly be a helical metal spring or a ring of metal mesh. As should be apparent in FIG. 2 the collar 5 (which is made from a suitable material which is also non-corrosive such as E.P.D.M.) is sandwiched in between the sleeve 4 and anchor 6 and is an axially compressed state.

Now, the existed collar or collapsible section was made of only one material to fulfill these three functions. However, only one material has its drawbacks due to its limited properties. Because these three functions relate to different property of material or different range of the same property. For example, the collapsible function needs the section break at certain pressure and the pressure is not small one, so if use softer material, either the section cannot be broken at certain load or the geometry of the section needs to be changed to handle higher load, but geometry is also limit to the spear space of the anchor combines the hole. So, a harder material is needed to fulfill the function. But harder material in the meantime will also affect the spinning and setting function. As for spinning function, most of design is to have some ribs or projections around the section which the diameter is bigger than the borehole and get more contact face to the borehole, so the ribs or projections can prevent anchor spinning during torqueing. When using harder material, the contact face and diameter needs to be designed very carefully, because if the diameter too big and contact face too much, we can hardly pre-assemble the anchor into the borehole, if the diameter too small and contact face too less, then during the setting or assembling, the base material of the borehole can easily shave the ribs or projections and have no anti-spinning function, because the material more harder also means more brittle. So, the softer and ductile material is better for anti-spinning and setting function.

Accordingly, it would be advantageous to have an improved fastener with an expansible sleeve to work well with balancing the above functions.

Accordingly, the primary object of the present invention is to provide an expansion anchor for anchorage in a bore hole that can be used also for heavy loads, that can perfectly balance the three functions of the collapsible function, the anti-spinning and setting functions.

In one embodiment, the present invention provides an expansion anchor, which comprises:
 a bolt, a spacer sleeve, an expansible sleeve, an expanding member,
 a collar, being arranged between the spacer sleeve and the expansible sleeve and having the form of a ring-like body,
 the bolt inserting into the spacer sleeve, the collar and expansible sleeve in sequence, and thread connected to the expanding member at its leading end, to thereby draw the expanding member into the expansible sleeve and expand radially;
 the collar is formed by a first material and a second material with different hardness.

Preferably, the tensile strength of the first material is from 40 Mpa to 100 Mpa, and the shoreA hardness of the second material is from 40 to 120. Preferably, the tensile strength of the first material is from 60 Mpa to 70 Mpa and the shoreA hardness of the second material is from 70 to 90.

In another embodiment, the present invention provides an expansion anchor, the first material forming the inner part of collar and the second material forming the outer part of collar. The first material and second material are molded together by double shot molding.

In yet another embodiment, the first material is molded as an inner ring body and the second material molded as ribs or projections on the outer surface of the ring body.

In yet another embodiment, the present invention provides an expansion anchor, wherein the first material forms inner ring body and the second material forms an outer ring with projections on the outer surface, the inner diameter of outer ring substantially equaling to the outer diameter of inner ring body, and the outer ring body assembled to the inner ring body by press fit or by adhesive.

Preferably, the ribs or projections on the outer surface have wedge shape.

Advantageously, the expansion anchor according to the present invention is formed by two materials with different hardness, the inner part with harder material to carry on the collapsible function, while the outer part with softer material to carry on the anti-spinning and setting functions. The inner part formed by harder material will not break until reaching certain high enough torque. The softer material of the outer part has better elastic and flexibility to deform when it is inserted into the bore hole and contacted onto the inner surface of the borehole. Therefore, the softer ribs or projections can prevent anchor spinning very well during torqueing. Also, as the softer outer part or projections, we can easily set the anchor into the borehole, and reduce the risk of the base material of the borehole shave the projections and have no anti-spinning function.

The invention, together with objects and advantages thereof, may best be understood by reference to the following description of preferred embodiments together with the accompanying drawings.

DETAILED DESCRIPTION OF THE DRAWINGS

Figure 1:
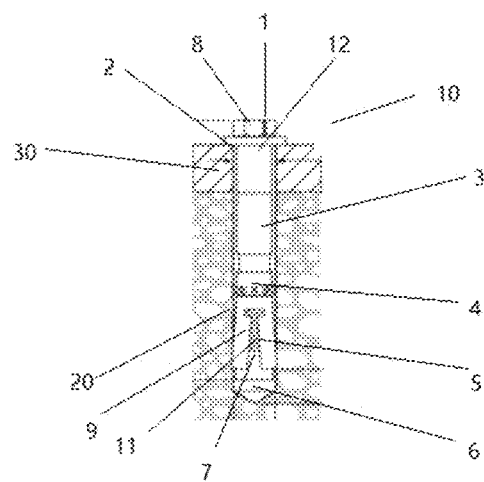
FIG. 1 is a schematic, perspective view of an expansion anchor having an expansible sleeve in accordance with an embodiment of the present invention.

The detailed description set forth below in connection with the appended drawings is intended as a description of presently preferred embodiments of the invention and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like members throughout. Furthermore, terms "comprises," "comprising," or any other variation thereof, are intended to cover a non-exclusive inclusion, such that module, circuit, device components, structures and method steps that comprises a list of members or steps does not include only those members but may include other members or steps not expressly listed or inherent to such module, circuit, device components or steps. A member or step proceeded by "comprises . (s). . a" does not, without more constraints, preclude the existence of additional identical members or steps that comprises the member or step.

Referring now to FIG. 1, a schematic assembled perspective view of an expansion anchor 10 in accordance with an embodiment of the present invention are shown. The expansion anchor consists of a bolt 1, a washer 2, a spacer sleeve 3, a collar 4, an expansible sleeve 5 and an expanding member 6. The bolt 1, spacer sleeve 3, and the expansible sleeve 5 all extend axially. All parts of the expansion anchor except for the collar 4 are made of metal, preferably, of steel.

The bolt 1 inserts into the spacer sleeve 3, the collar 4 and expansible sleeve 5 in sequence, and thread connected to the expanding member 6 at its leading end 11. The leading end 11 is provided with an external male thread which can be screw connected by means of an internal female thread (not shown) arranged in a passage hole of the expanding member 6. The bolt 1 has a hexagonal head 8 and a washer 2 on its trailing end 12 opposite the setting or leading end 11 for fastening a member. There are various types of expansion anchors used in the arts. FIG. 2 illustrates several alternative forms of expansion anchors, in which an abutment means is arranged on the anchor rod and shaped to enable torque to be applied thereto, for example, hexagonal head or countersunk head, for different applications. Certainly, any types of abutment to thread rod used for applying torque could be used herein, not limited by the choice of special terminology or term. Individual features, method or function related thereto, or combinations thereof may be patentably inventive.

As shown in FIG. 1, when an object 30 is going to be secured onto a concrete by using an expansion anchor, usually, we use the correct diameter metric bit and drill borehole 20 to minimum required hole depth firstly, then remove drilling debris with a blowout bulb or with compressed air. Next, using a hammer, tap the anchor through the object 30 being fastened into the drilled hole until the washer 2 is in contact with the fastened object 30. Finally, using a torque wrench, apply the specified installation torque. Some of light load expansion anchor does not require use of a torque wrench.

An expanding member 6 of conically tapering configuration is provided with an inner bore which is internally screw threaded so that the screw thread of the leading portion 11 of the bolt 1 can mesh therewith. For example, the expanding member 6 could be formed as a cone. It will be clear that as the bolt is rotated the expander member 6 will be drawn deeper into the expansible sleeve 5 from the leading end 11 in the direction towards the trailing end 12. This results in radial expansion of the expansible sleeve 5 into engagement with the surrounding material of the wall in which the bore hole is formed wherein the expansible sleeve 5 is disposed. To facilitate this radial expansion, the expansible sleeve 5 may be provided with longitudinal slots 7 distributed over its circumference.

Figure 2A:
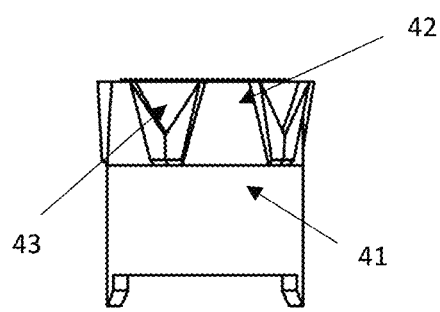
FIG. 2a is a schematic view of the collar of the expansion anchor in accordance with an embodiment of the present invention.
Figure 2B:
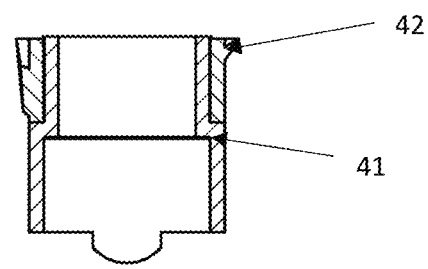
FIG. 2b is a cross-sectional view of a collar of the expansion anchor of the FIG. 2a in accordance with an embodiment of the present invention.

FIGS. 2a and 2b show the collar 4 according to the present invention. The collar 4 is designed as a ring-like body consisting of at least two suitable materials is sandwiched in between the spacer sleeve 3 and the expansible sleeve 5 and is axially compressed. As will be described in detail hereinafter, the materials which are also non-corrosive to form the collar 4 shall include one first tough and breakproof material, for example, POM resin, ABS, PA, PC, however, at the same time a second relatively soft, deformable material, such as an elastic plastics material, TPE, or rubber. The relative dimensions of the collar 4 in relation to the diameter of the threaded rod 1 are believed to be particularly advantageous. Preferably, the annular collar 4 between the spacer sleeve 3 and the expansible sleeve 5 has the same external diameter as the two sleeves 3 and 5.

In one preferred embodiment of the present invention, the collar 4 is designed as a ring like body. As shown in FIG. 2a and FIG. 2b, the ring-like body of the collar 4 include an inner part 41 formed by a first hard material and the outer part 42 formed by a second soft material form. The tensile strength of the first material is from 40 Mpa to 100 Mpa, and the shoreA hardness of the second material is from 40 to 120. Preferably, the tensile strength of the first material is from 60 Mpa to 70 Mpa and the shoreA hardness of the second material is from 70 to 90.

Preferably, the first material and second material are molded together by double shot molding, the first material molded into the inner part 41 as a stepped ring and the second material molded as ribs or projections 43 on the outer surface of the inner part 41. The outer diameter of upper stepped portion is a bit smaller than the outer diameter of the lower step portion of the inner part 41. The inner part 41 of the collar 4 could be a ring with higher hardness while the outer part 42 could be multiple rib or projections 43 over the circumferential outer surface of the inner part 41 with ring shape. The projections 43 could be designed as a wedge shape as shown in FIG. 2a.

Figure 3A:
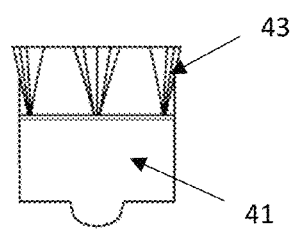
FIG. 3a is a schematic view of the collar of the expansion anchor in accordance with the other embodiment of the present invention.
Figure 3B:
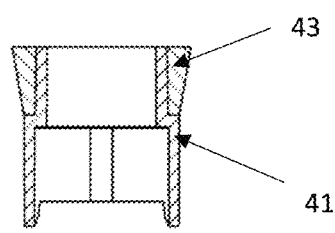
FIG. 3b is a cross-sectional view of a collar of the expansion anchor of the FIG. 3a in accordance with the other embodiment of the present invention.

Alternatively, the outer part 42 could be designed as ring with some ribs or protections 43, too. For example, as shown in FIG. 3a and FIG. 3b, the projections 43 could be designed with a triangular shape. This could have more balance between the setting energy and anti-spinning, in the lower part has small outer diameter and less contact face to gain easy setting ability, with continuously increasing outer diameter and contact face, at the end we still get anti-spinning function.

Figure 4A:
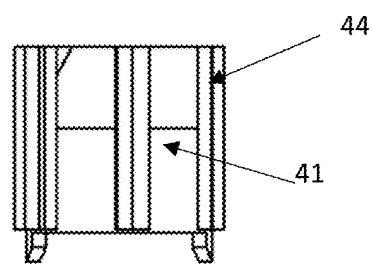
FIG. 4a is a schematic view of the collar of the expansion anchor in accordance with another embodiment of the present invention.
Figure 4B:
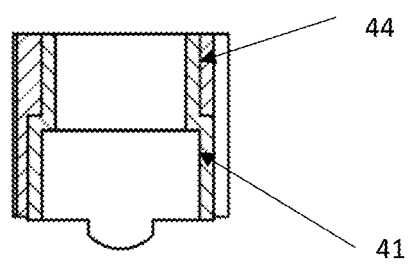
FIG. 4b is a cross-sectional view of a collar of the expansion anchor of the FIG. 4a in accordance with another embodiment of the present invention.
Figure 5A:
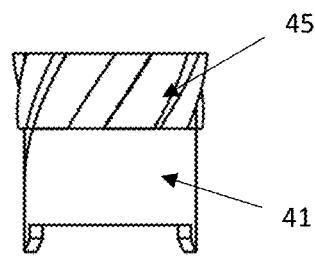
FIG. 5a is a schematic view of the collar of the expansion anchor in accordance with a further another embodiment of the present invention.
Figure 5B:
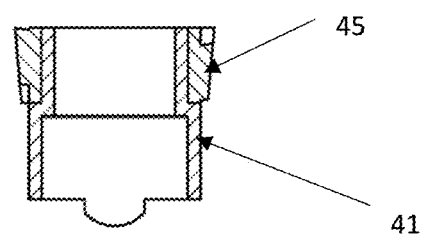
FIG. 5b is a cross-sectional view of a collar of the expansion anchor of the FIG. 5a in accordance with a further another embodiment of the present invention.

In another embodiment, as shown in FIGS. 4a and 4b, the outer parts could be designed as ribs 44 axial extending along the ring-like inner part 41, which has most contact face to have most stable anti-spinning function.

In yet another embodiment, the outer part 42 could be with spiral shape. The spiral shape of outer part need less setting energy and more contact face comparing with the outer parts as ribs or projections.

In yet another embodiment, the inner diameter of outer ring substantially equaling to the outer diameter of inner ring body, and the outer ring body assembled to the inner part 41 by press fit or by adhesive.

If now, for example, with the aid of a screwdriver, the expansion anchor 10 is turned in its stage as extending into the prepared borehole 20, then the conical expanding member 6 is drawn into the expansible sleeve 5. In consequence of this, the expansible sleeve 5 acts against the cylindrical surface of the receiving borehole 20 to retain the expansion anchor 10 in the concrete. Turning of the expansion anchor 10 with the aid of the screwdriver may then be continued until reaching a firm seating of the expansion anchor 10 inside the borehole 20. This firm seating is reached when the conical expanding member 6, as far as is permitted by the diameter of the borehole 20, has been drawn into the expansible sleeve 5. The segments 9 of the expansible sleeve 3 are then firmly applied with a majority of their external surface by the conical expanding member 6, to the wall of the borehole 20. The object 30 to be secured to a concrete, for example a wall, a ceiling, or a floor is still loosely slipped on to the rod 1 or else, in the position of the expansion anchor as firmly seated in the borehole 20.

In this mounting phase of the expansion anchor inside the borehole 20 as shown in FIG. 1, no pressure has yet been exerted upon the collar 4. However, when the expansion anchor is inserted into the borehole, if the diameter of the borehole is not very perfect, for example, the diameter is somewhat small, then there is a risk to shave the ribs or projections 43 of the collar if the projections are not elastic or flexible enough. The soft material formed the outer part 42 of the collar 4 would greatly advantageously improve setting function and easy to preassemble.

Refer to FIGS. 1 to 5, during the mounting process, by tightening the threaded head 8 the collar 4 is compressed between the expansible sleeve 3 and the spacer sleeve 2 and, in the course of this, deformed to such an extent that the periphery of the collar 4 will come to lie against the wall of the borehole 20 so that, in addition to the firm seating of the expansible sleeve 3 inside the borehole 20 the expansion anchor is still supported inside the borehole 20 at the point of the deformed collar 4. In this way, the soft outer part 42 may contact the cylindrical surface of the borehole 20, the projects 43 act against on the inner surface of the borehole, as the material of the outer part is elastic or ductile, the friction between the collar 4 and inner surface of borehole 20 would be increased, therefore, it can prevent spinning of the expansion anchor. The expansion anchor is prevented from tilting around the point of firm seating (conical expansion member 5 and segments 9 of the expansible sleeve 3) inside the borehole 20, which otherwise might cause the firm seating inside the borehole 20 to become loose in the long run.

If further torque is applied to the threaded rod 1 after achieving the predetermined anchorage value, the collar 4 might deform, even collapse, in its axial length after overcoming an initial deformation force. The torque continuing to act on the head 8, upon the initial deformation force being exceeded, the inner part 41 of the collar 4 is broken, so that the collar may be shorten in the axial direction. Thus, further tightening the expansion anchor 10 yields the axial compression of collar 4 so that the rod is tensioned with no or minimize movement of the anchor toward the head, thereby minimizing the damage to the concrete.

In another embodiment, preferably, the inner part 41 of the collar is a stepped ring like body, as shown in the section view of FIG. 4. the inner part 41 consists of individual diameter regions or sections 43 and 44. The upper section 43 is smaller than the lower section 44, and the outer part 42 is covered or surrounded around the upper section 43. The outer diameter of the outer part could be a bit larger the outer diameter of the lower section 44 of the inner part 41. Preferably, the outer part could be molded by double shot molding directly on the inner part, therefore the collar made by two materials as one piece. It would be advantageously in manufacturing. Alternatively, the inner part 41 and the outer part could be individually and connected by an adhesive connection or by being a press fit.

Consisting of a material of the collar 4 which is deformable or collapsible with certain limits, there is obtained the optimum amount of expansion until reaching the firm seating of the expansion high-load anchor insider the prepared borehole 20. Any tilting moment likely to be caused by the slippage of the expansion anchor inside the borehole 20 is avoided by providing an additional support at the point at which the deformed collar 4 is in contact with the wail of the borehole when the object 30 to be secured is acted upon by a load.

The function of the collar 4 is to provide sufficient resistance to compression to substantially maintain its axial length, and restrain the anchor from rotation, during initial spreading of the expansible sleeve until the expansible sleeve are thrust against the cylindrical surface of the hole; and thereafter to yield if need be as the compressive forces are increased due to the threaded rod being tensioned. Thus, a variety of other forms of collar and collar-like structures may be possibly employed in lieu of the collar 4. For example, a collar 4 comprising an inner part 41 of perforate metal or hard plastics formed to substantially cylindrical form, or an outer part of softer or more flexible metal or plastic over the inner part 41.

The description of the preferred embodiments of the present invention has been presented for purposes of illustration and description but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiments disclosed but covers modifications within the spirit and scope of the present invention as defined by the appended claims.

The invention claimed is:

1. An expansion anchor, comprising:
 a bolt;
 a spacer sleeve;
 an expansible sleeve;
 an expanding member; and
 a collar, wherein the collar is disposed between the expansible sleeve and the spacer sleeve;
 wherein the bolt is insertable into the spacer sleeve, the collar, and expansible sleeve in sequence and wherein a thread of the bolt at a leading end of the bolt is connected to the expanding member to draw the expanding member into the expansible sleeve and expand the expansible sleeve radially;
 wherein the collar is formed by a first material with a first hardness and a second material with a second hardness wherein the first hardness is different from the second hardness;
 wherein the first material forms an inner part of the collar and the second material forms an outer part of the collar;
 wherein the first hardness of the first material is higher than the second hardness of the second material.

2. The expansion anchor according to claim 1, wherein the inner part of the collar is in a form of a ring-like body and wherein the outer part of the collar surrounds around the inner part of the collar.

3. The expansion anchor according to claim 1, wherein the inner part of the collar and the outer part of the collar are molded together by double shot molding.

4. The expansion anchor according to claim 1, wherein the inner part of the collar and the outer part of the collar are assembled together by press fit or adhesive.

5. The expansion anchor according to claim 1, wherein the outer part of the collar is a plurality of projections each with a wedge shape disposed on an outer surface of the inner part of the collar.

6. The expansion anchor according to claim 1, wherein the outer part of the collar is a plurality of projections each with a triangular shape disposed on an outer surface of the inner part of the collar.

7. The expansion anchor according to claim 1, wherein the outer part of the collar is a plurality of ribs axially extending on an outer surface of the inner part of the collar.

8. The expansion anchor according to claim 1, wherein the first material is POM, PVC, or ABS and the second material is TPE, TPU or rubber.

9. The expansion anchor according to claim 1, wherein a tensile strength of the first material is from 40 Mpa to 100 Mpa and a shoreA hardness of the second material is from 40 to 120.

* * * * *